(No Model.)

H. WALTER.
GALVANIC BATTERY.

No. 342,407. Patented May 25, 1886.

WITNESSES:
Abram May
a. M. Iliff

INVENTOR
Hugo Walter
BY
R. M. Hosea
ATTORNEY

N. PETERS, Photo-Lithographer, Washington, D. C.

UNITED STATES PATENT OFFICE.

HUGO WALTER, OF CINCINNATI, OHIO, ASSIGNOR TO THE WALTER ELECTRIC COMPANY, OF SAME PLACE.

GALVANIC BATTERY.

SPECIFICATION forming part of Letters Patent No. 342,407, dated May 25, 1886.

Application filed May 7, 1885. Serial No. 164,704. (No model.)

*To all whom it may concern:*

Be it known that I, HUGO WALTER, a citizen of the United States, residing at Cincinnati, Ohio, have invented new and useful Improvements in Galvanic Batteries, of which the following is a specification.

My invention relates to galvanic cell-batteries, its object being to increase the efficiency and convenience of their operation, as hereinafter more fully explained.

In order to avoid the necessity of emptying and cleansing battery-cells when the liquid contained therein has become weakened and the flow of the electrical current retarded or arrested, as happens in every powerful battery-cell when it has done continuous work for a short space of time, I provide my cell with a faucet near the bottom, by which I can regulate a continuous exhaust of the liquid to any desired extent, and in connection therewith provide a reservoir of fresh liquid, arranged to fill the cell in the same proportion as I allow the vitiated liquid of the cell to escape by the said faucet. I thus maintain an equilibrium of fresh liquid circulating in the battery, and the current remains constant for the length of time that I keep the feed-reservoir supplied with fresh liquid and the dissolving electrode holds out.

My invention is of course applicable to those containing a porous cup, and also to those where both poles are immersed in the same solution; but, considering the mechanical difficulty of applying the faucet to a porous cup, which would have to pierce the outer cell and still leave it water-tight, and the necessity of having a double feed and a double exhaust, I prefer to use my arrangement in a cell having both poles in the same liquid.

Figure 1:
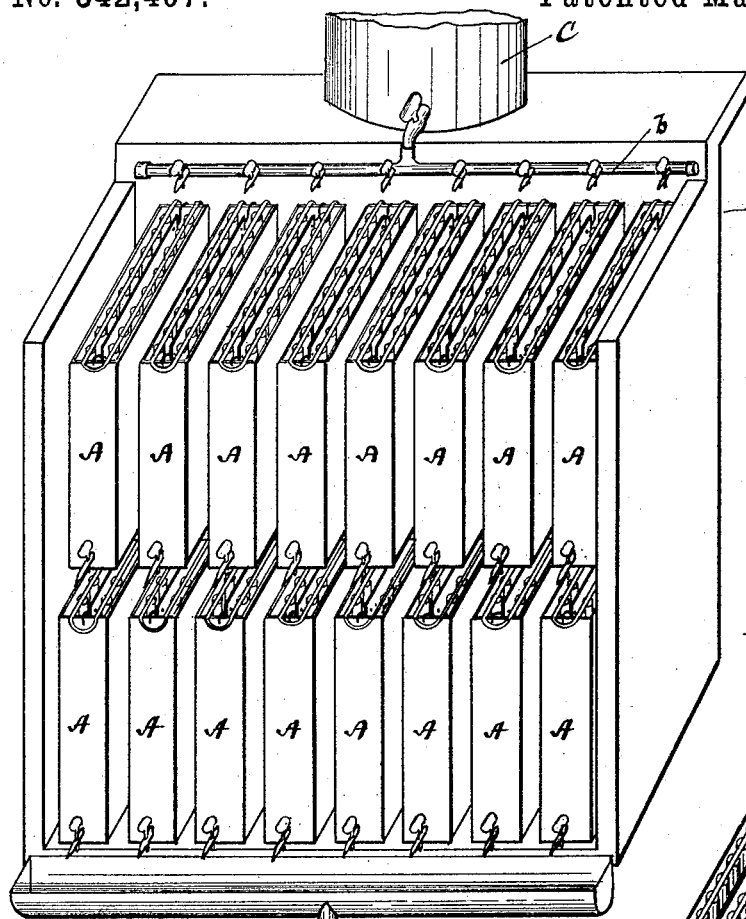
Figure 2:
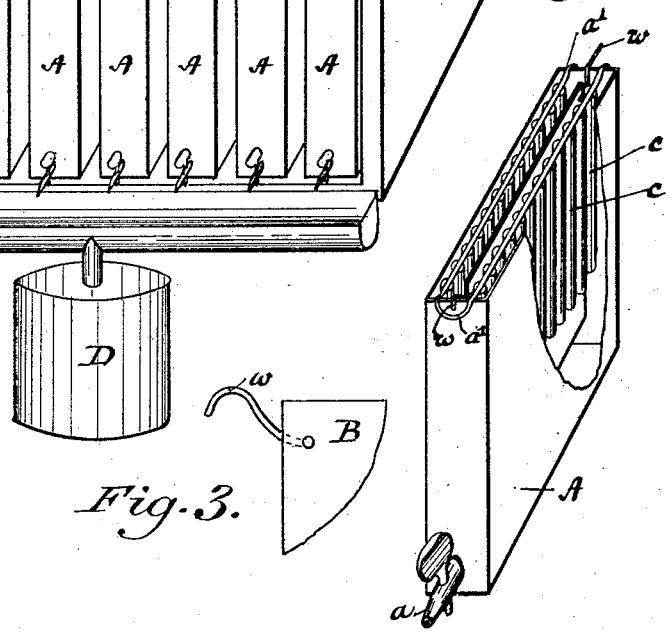
Figure 3:
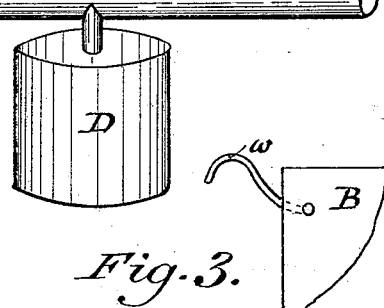

My invention is illustrated in the accompanying drawings, in which Figure 1 is a perspective elevation of a battery of sixteen cells arranged in self-feeding series; Fig. 2, a perspective view of a single cell detached, with its sides partially removed to exhibit the interior construction; Fig. 3, a perspective view of one of the zinc plates.

The form of cell which I prefer to employ, for convenience of combining in series, is a deep and narrow trough, A, preferably made of vulcanized rubber, a convenient size being twelve inches by twelve inches by two inches; and this I provide with a stop-cock, $a$, of the same material, arranged at one end of the bottom. In this trough I place a zinc plate, B, of moderate thickness, (about ten inches square, where the above proportions are employed,) pierced near the corresponding upper corners with copper wires $a$, secured in the apertures, as shown, by which it is hung over the upper ends of the trough A, retaining the plate centrally therein at a uniform distance from the bottom and ends, and serving to lead out the current. I thus obtain intimate contact without the employment of binding-screws, &c.

The other pole consists of carbon, preferably a series of "carbon points," $e$, such as are used in ordinary arc lamps, arranged as follows: I first electroplate the butt ends of the carbon points with a suitable metal—such as copper—sufficiently to admit of soldering to a copper strip, $a'$, leaving about the space of one carbon point between each two so secured, and extend the strip and carbons so as to encircle the zinc plate without touching, the strip resting upon and projecting over the ends of the cell. I thus gain a very large surface of depolarization and permit a free circulation of the liquid.

As the exciting-liquid I use a saturated solution of bichromate of potash, to which I add, while cold, twenty-five percentum by the volume of commercial sulphuric acid and a small amount of bisulphide of mercury to keep the zincs amalgamated. A hydrochloric solution will work as well, the proportion, however, being fifty percentum instead of twenty-five, as in the case of sulphuric acid.

The electro-motive force of the cell so constructed and supplied is slightly above two volts, and the current constant.

To constitute a working battery for general use, I place in an elevated position above the cells, arranged as shown in Fig. 1, a ten-gallon jar, C, filled with the solution described, having a faucet, discharging into a distributing-tube, $b$, of hard rubber provided with distributing-faucets corresponding in number and position with the cells A. The upper tier of cells being placed immediately above a lower tier, the discharge-faucets of the former allow the liquid contents to feed downward into those below; and any number of cells may thus be arranged in distributing series. The lowest tier of cells discharge into a collecting tube or trough, $d$, and the liquid is finally discharged into a suitable receptacle, D.

A series of forty-eight cells of the character and size described, joined for tension, furnish a current of one and one-half horse-power, lighting twelve of my incandescent lamps to whiteness, each lamp requiring two and a quarter ampères and an electro-motive force of ninety-five volts before becoming white.

A single cell such as described, in short circuit, gives forty ampères.

The liquid is regulated to drop at the rate of a quart an hour, and the ten-gallon feeding-jar furnishes light for forty-hours. The same liquid can be used three times; but for use the third time its flow should be reduced to two quarts an hour. To use it a fourth time, ten percentum of new solution should be used.

It has been for many years an important object to produce a battery which shall have continuous action, and in which the usual and frequent necessity of arresting the battery action, cleansing the cups, and removing the exciting-liquids shall be dispensed with. It is also desirable for batteries used for interior lighting and for small motors to secure a current which shall be practically without fluctuation. The utmost economy practicable is also essential in this class of batteries, and for the effectual accomplishment of this purpose I have adopted a construction in which all liability to local waste of current is avoided, while at the same time I obtain a current which is practically continuous for an indefinite period. This result is dependent in part upon the peculiar construction and relative arrangement of the electrodes, and in part upon the combination, with the same, of a continuous feed of the exciting-liquid. By my invention, also, I provide a battery of simple construction, which is practically a unitary structure, but from which any cell may be easily detached for repairs, and which may be stored in one-half or less of the space usually required.

I claim as my invention and desire to secure by Letters Patent of the United States—

1. In a galvanic battery, the combination, with two or more separate cells or series of cells, each having an oblong shape, of a zinc electrode composed of a flat plate extending from end to end of the cell, a double series of carbon rods arranged in parallel lines opposite each face of the zinc plate, and a reservoir containing an exciting-liquid and having a faucet or series of faucets feeding continuously into each cell, the latter being provided with a suitable exhaust, substantially as described.

2. In a galvanic battery, the combination, with a cell having an oblong or elongated shape, of a zinc electrode composed of a flat plate having copper wires running continuously along each side and resting upon the ends of the cell, and a double series of carbon rods soldered to said wires and arranged in parallel lines opposite the faces of the zinc plate, substantially as described.

In witness whereof I have hereunto set my hand in the presence of two subscribing witnesses.

HUGO WALTER.

Witnesses:
 L. M. HOSEA,
 ABRAM MAY.